（12）United States Patent
Kambayashi et al.

(10) Patent No.: US 10,637,010 B2
(45) Date of Patent: Apr. 28, 2020

(54) METHOD FOR MANUFACTURING ENERGY STORAGE DEVICE AND APPARATUS FOR MANUFACTURING ENERGY STORAGE DEVICE

(71) Applicant: GS Yuasa International Ltd., Kyoto-shi (JP)

(72) Inventors: Hirokazu Kambayashi, Kyoto (JP); Kazuto Maeda, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 81 days.

(21) Appl. No.: 15/546,600

(22) PCT Filed: Mar. 29, 2016

(86) PCT No.: PCT/JP2016/060228
§ 371 (c)(1),
(2) Date: Jul. 26, 2017

(87) PCT Pub. No.: WO2016/158998
PCT Pub. Date: Oct. 6, 2016

(65) Prior Publication Data
US 2018/0006276 A1   Jan. 4, 2018

(30) Foreign Application Priority Data

Mar. 31, 2015 (JP) ................. 2015-072970

(51) Int. Cl.
*H01M 2/02* (2006.01)
*H01G 11/84* (2013.01)
(Continued)

(52) U.S. Cl.
CPC ................ *H01M 2/02* (2013.01); *B23K 9/16* (2013.01); *B23K 26/14* (2013.01); *B23K 26/26* (2013.01);
(Continued)

(58) Field of Classification Search
CPC ...... B23K 26/14; B23K 2101/36; B23K 9/16; B23K 26/26; H01M 2/02; H01M 10/058;
(Continued)

(56) References Cited

U.S. PATENT DOCUMENTS

2009/0183190 A1   7/2009  Fukuda et al.
2010/0078413 A1   4/2010  Hosokawa et al.

FOREIGN PATENT DOCUMENTS

JP   H 06-304777 A    11/1994
JP   2003-168405 A     6/2003
(Continued)

OTHER PUBLICATIONS

Sealing Port Welding Method by Tamura Yutaka et al. In (JP 2003168405 (A)—Jun. 13, 2003) the machine English language translation. (Year: 2003).*

(Continued)

*Primary Examiner* — Jonathan G Jelsma
*Assistant Examiner* — Omar M Kekia
(74) *Attorney, Agent, or Firm* — Mcginn I.P. Law Group, PLLC.

(57) ABSTRACT

In a method for manufacturing an energy storage device by applying welding to a container of the energy storage device, the method includes: arranging a jig on which wall surfaces are formed between two parts to be welded to which welding is applied; and welding the two parts to be welded while supplying a shield gas to the two parts to be welded from two different directions corresponding to the two parts to be welded.

18 Claims, 9 Drawing Sheets

(51) Int. Cl.
  *H01G 11/78* (2013.01)
  *H01G 11/80* (2013.01)
  *B23K 26/14* (2014.01)
  *H01M 2/04* (2006.01)
  *B23K 26/26* (2014.01)
  *B23K 9/16* (2006.01)
  *H01G 9/00* (2006.01)
  *H01M 10/058* (2010.01)
  *B23K 101/36* (2006.01)

(52) U.S. Cl.
  CPC ........... *H01G 9/0029* (2013.01); *H01G 11/78* (2013.01); *H01G 11/80* (2013.01); *H01G 11/84* (2013.01); *H01M 2/0439* (2013.01); *H01M 10/058* (2013.01); *B23K 2101/36* (2018.08); *H01M 2/0473* (2013.01); *H01M 2220/20* (2013.01); *Y02E 60/13* (2013.01); *Y02T 10/7022* (2013.01)

(58) Field of Classification Search
  CPC ............. H01M 2/0439; H01M 2/0473; H01M 2220/20; Y02T 10/7022; Y02E 60/13; H01G 11/78; H01G 11/80; H01G 11/84; H01G 9/0029
  USPC ........................................................ 29/623.1
  See application file for complete search history.

(56) References Cited

FOREIGN PATENT DOCUMENTS

| | | |
|---|---|---|
| JP | 2009-166065 A | 7/2009 |
| JP | 2010-105041 A | 5/2010 |
| JP | 2013-197034 A | 9/2013 |
| JP | WO2012/026305 A1 | 10/2013 |
| JP | 2014-127400 A | 7/2014 |

OTHER PUBLICATIONS

International Search Report (ISR) (PCT Form PCT/ISA/210), in PCT/JP2016/060228, dated Jun. 21, 2016.

\* cited by examiner

METHOD FOR MANUFACTURING ENERGY STORAGE DEVICE AND APPARATUS FOR MANUFACTURING ENERGY STORAGE DEVICE

TECHNICAL FIELD

The present invention relates to a method for manufacturing an energy storage device and an apparatus for manufacturing an energy storage device.

BACKGROUND ART

Conventionally, in the manufacture of an energy storage device, there has been known a technique where a container of the energy storage device is formed by applying laser beam welding to the container. In such laser welding where welding is performed by using a laser beam, to suppress oxidation of metal of a part to be welded (welded part) caused by the exposure of the metal with outside air, an inert gas referred to as a shield gas is supplied to the part to be welded thus isolating the part to be welded from air. There has been disclosed a laser welding apparatus where a shield gas is supplied toward the part to be welded from two directions on both sides which sandwich the part to be welded so as to bring the whole part to be welded which is an object to be welded into a shield gas atmosphere (see patent literature 1, for example).

PRIOR ART DOCUMENT

Patent Document

Patent Document 1: JP-A-2010-105041

SUMMARY OF THE INVENTION

Problems to be Solved by the Invention

However, in the above-mentioned conventional laser welding apparatus, there is a possibility that defective welding occurs.

The present invention has been made to overcome such a drawback, and it is an object of the present invention to provide a method for manufacturing an energy storage device which can reduce the occurrence of defective welding and the like.

Means for Solving the Problems

To achieve the above-mentioned object, according to an aspect of the present invention, there is provided a method for manufacturing an energy storage device which is a method for manufacturing an energy storage device by applying welding to a container of the energy storage device, wherein the method includes: an arranging step of arranging a jig on which a wall surface is formed between two parts to be welded to which welding is applied; and a welding step of applying welding to the two parts to be welded while supplying a shield gas to the two parts to be welded from two different directions corresponding to the two parts to be welded.

With such a configuration, respective shield gases supplied toward two parts to be welded from two different directions pass through areas in the vicinity of the respective parts to be welded and, thereafter, the directions that these shield gases flow are changed by the jig. To be more specific, the shield gases are directed in the direction away from the container. That is, by arranging the jig between the two parts to be welded, it is possible to prevent merging of two flows of the shield gases at the two parts to be welded. With such a configuration, the generation of a turbulent flow by the shield gases at the two parts to be welded can be reduced and hence, it is possible to form a stable shield gas atmosphere at the two parts to be welded. Accordingly, the occurrence of defective welding can be reduced.

Advantages of the Invention

According to the method for manufacturing an energy storage device of the present invention, it is possible to form a stable shield gas atmosphere at parts to be welded and hence, the occurrence of defective welding can be lowered.

MODE FOR CARRYING OUT THE INVENTION

Figure 1:
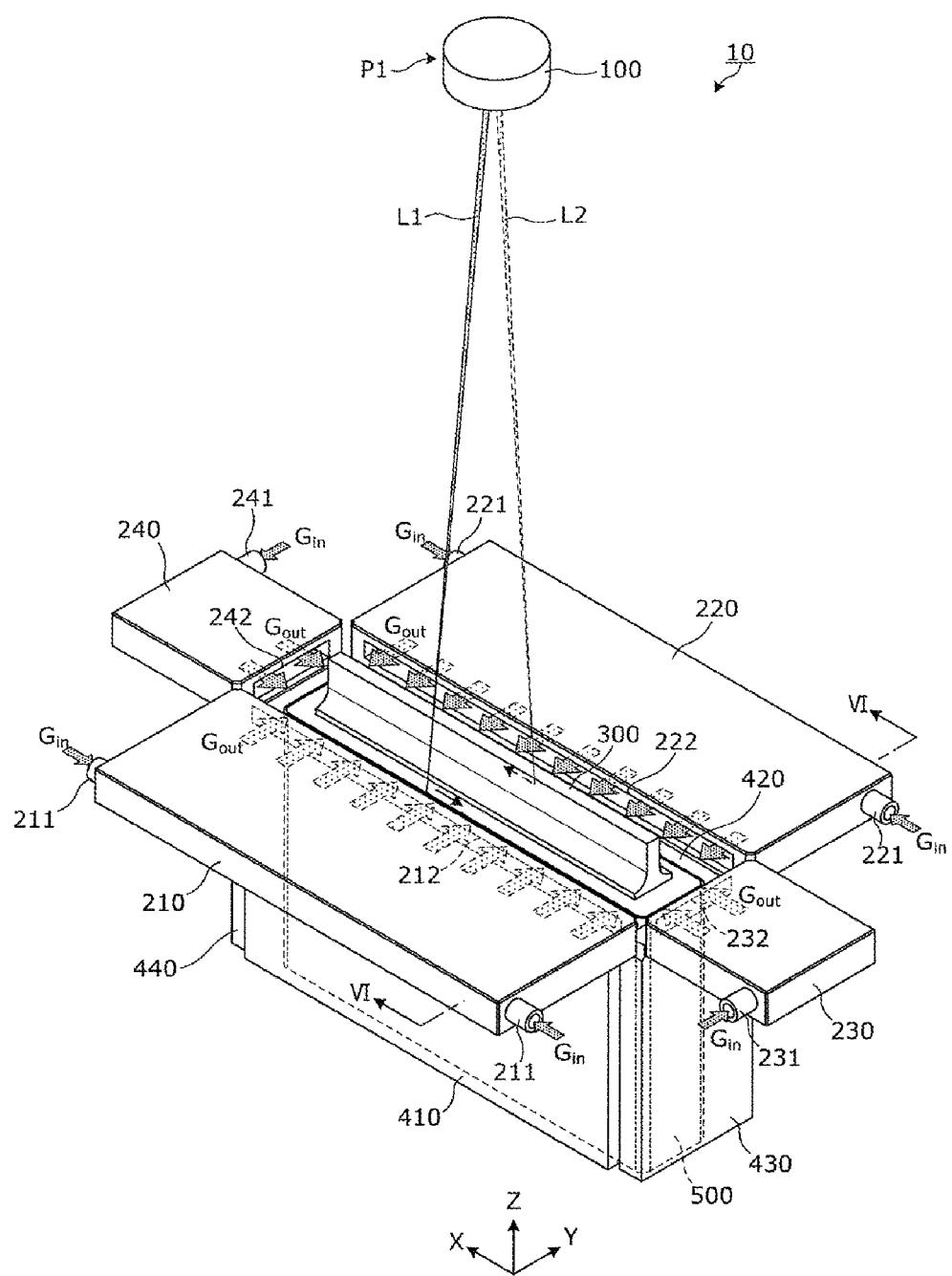
FIG. 1 is a view showing an external appearance of an apparatus for manufacturing an energy storage device according to this embodiment.

In the above-mentioned conventional laser welding apparatus, there is a possibility that defective welding occurs.

That is, in the conventional laser welding apparatus, shield gases flown into the parts to be welded from two different directions collide with each other thus giving rise to a possibility that a turbulent flow is generated in areas in the vicinity of the parts to be welded. Accordingly, it is difficult to form a stable shield gas atmosphere at the parts to be welded. As a result, there is a possibility that defective welding occurs.

The present invention has been made to overcome the above-mentioned drawbacks, and it is an object of the present invention to provide a method for manufacturing an energy storage device which can reduce the occurrence of defective welding and the like by forming a stable shield gas atmosphere.

To achieve the above-mentioned object, it is an aspect of the present invention to provide a method for manufacturing an energy storage device by applying welding to a container of the energy storage device, wherein the method includes: an arranging step of arranging a jig on which a wall surface is formed between two parts to be welded to which welding is applied; and a welding step of applying welding to the two parts to be welded while supplying a shield gas to the two parts to be welded from two different directions corresponding to the two parts to be welded.

With such a configuration, respective shield gases supplied toward two parts to be welded from two different directions pass through areas in the vicinity of the respective parts to be welded and, thereafter, the directions that these shield gases flow are changed by the jig. To be more specific, the shield gases are directed in the direction away from the container. That is, by arranging the jig between the two parts to be welded, it is possible to prevent merging of two flows of the shield gases at the two parts to be welded. With such a configuration, the generation of a turbulent flow by the shield gases at the two parts to be welded can be reduced and hence, it is possible to form a stable shield gas atmosphere at the two parts to be welded. Accordingly, the occurrence of defective welding can be reduced.

In the welding step, the shield gas supplied to the part to be welded may flow along an inclined surface which is at least a portion of the wall surface.

With such a configuration, it is possible to make two respective flows of the shield gases supplied from two respective different directions easily flow along the wall surface of the jig. Accordingly, the directions that two shield gas flows respectively flow can be changed so as to prevent the generation of a turbulent flow. Accordingly, it is possible to form a stable shield gas atmosphere at the two parts to be welded and hence, the occurrence of defective welding can be reduced.

In the arranging step, the jig may be arranged in a state where the jig is brought into contact with the container.

With such a configuration, it is possible to prevent merging of two flows of the shield gases supplied from two directions at the two parts to be welded. Further, heat generated in the container by welding can be transferred to the jig and hence, the two parts to be welded can be cooled.

The method for manufacturing an energy storage device may further include a cooling step of cooling the jig.

With such a configuration, heat generated by welding and transferred to the jig can be radiated and hence, it is possible to prevent the jig from becoming a high temperature even when the jig is repeatedly used. Accordingly, during welding of the container of the energy storage device, it is possible to prevent the jig at a high temperature from adversely affecting the energy storage device by being brought into contact with the container. Further, the degradation of the jig caused by a change in temperature can be prevented and hence, a lifetime of the jig can be prolonged.

In the welding step, welding may be applied to the two parts to be welded by irradiating a laser beam toward the two parts to be welded from a predetermined position while changing an irradiation angle.

With such a configuration, even when welding is applied to the two parts to be welded by scanning a laser beam, it is possible to form a stable shield gas atmosphere at the two parts to be welded.

An apparatus for manufacturing an energy storage device according to an aspect of the present invention is an apparatus for manufacturing an energy storage device for applying welding to a container of the energy storage device, wherein the apparatus includes a jig on which a wall surface is formed and which is arranged between two parts to be welded to which welding is applied and to which a shield gas is supplied from two different directions.

With such a configuration, respective shield gases supplied toward the two parts to be welded from two different directions pass through areas in the vicinity of the respective parts to be welded and, thereafter, the directions that these shield gases flow are changed by the jig. To be more specific, the shield gases are directed in the direction away from the container. That is, by arranging the jig between the two parts to be welded, it is possible to prevent merging of two flows of the shield gases at the two parts to be welded. Accordingly, the generation of a turbulent flow by the shield gases at the two parts to be welded can be reduced and hence, it is possible to form a stable shield gas atmosphere at the two parts to be welded. Accordingly, in applying welding to the two parts to be welded, the occurrence of defective welding can be reduced.

The apparatus for manufacturing an energy storage device may further have two blow-off ports through which a shield gas is supplied to the two parts to be welded from two different directions.

With such a configuration, it is possible to easily supply shield gases to the two parts to be welded.

At least a portion of the wall surface may be inclined with respect to the direction that the shield gas flows.

As described above, the directions of two respective flows of the shield gases supplied from two different directions can be changed by making two respective flows of the shield gases flow along the inclined surface of the jig. Accordingly, it is possible to change the directions that the shield gas flows so as to prevent the generation of a turbulent flow. With such a configuration, it is possible to form a stable shield gas atmosphere at the two parts to be welded and hence, the occurrence of defective welding can be reduced.

The container may include a body having a rectangular opening and an elongated plate-like lid body which closes the opening, the two parts to be welded may form two long-side portions disposed opposite to each other out of a rectangular annular boundary portion between the body and the lid body, the jig may be arranged between the two long-side portions, and at least a portion of the wall surface may be inclined with respect to a direction that the shield gas flows such that the portion is disposed more away from the container as the portion extends to a downstream side in the direction that the shield gas flows.

With such a configuration, the jig is arranged between the two long-side portions which define a short distance therebetween and respectively have a long welding distance and hence, at the two portions which are disposed opposite to each other out of the rectangular annular boundary portion between the body and the lid body which are the part to be welded, it is possible to prevent merging of shield gases supplied from two different directions. Further, the directions that the shield gases flow can be changed to the direction away from the container and hence, it is possible to prevent merging of the shield gases supplied from two different directions at the part to be welded of the container.

Hereinafter, a method for manufacturing an energy storage device and an apparatus for manufacturing an energy storage device according to an embodiment of the present invention are described with reference to drawings. The embodiment described hereinafter is one preferred specific example of the present invention. In the embodiment described hereinafter, numerical values, shapes, materials, constitutional elements, the arrangement positions and connection states of the constitutional elements and the like are merely examples, and these are not intended to be used for limiting the present invention. Further, out of the constitutional elements in the embodiment described hereinafter, the constitutional elements which are not described in independent claims describing an uppermost concept are described as arbitrary constitutional elements. In the respective drawings, the respective constitutional elements are not described strictly accurately in size or the like.

Embodiment

First, a manufacturing apparatus 10 for manufacturing an energy storage device 500 is described.

Figure 2:
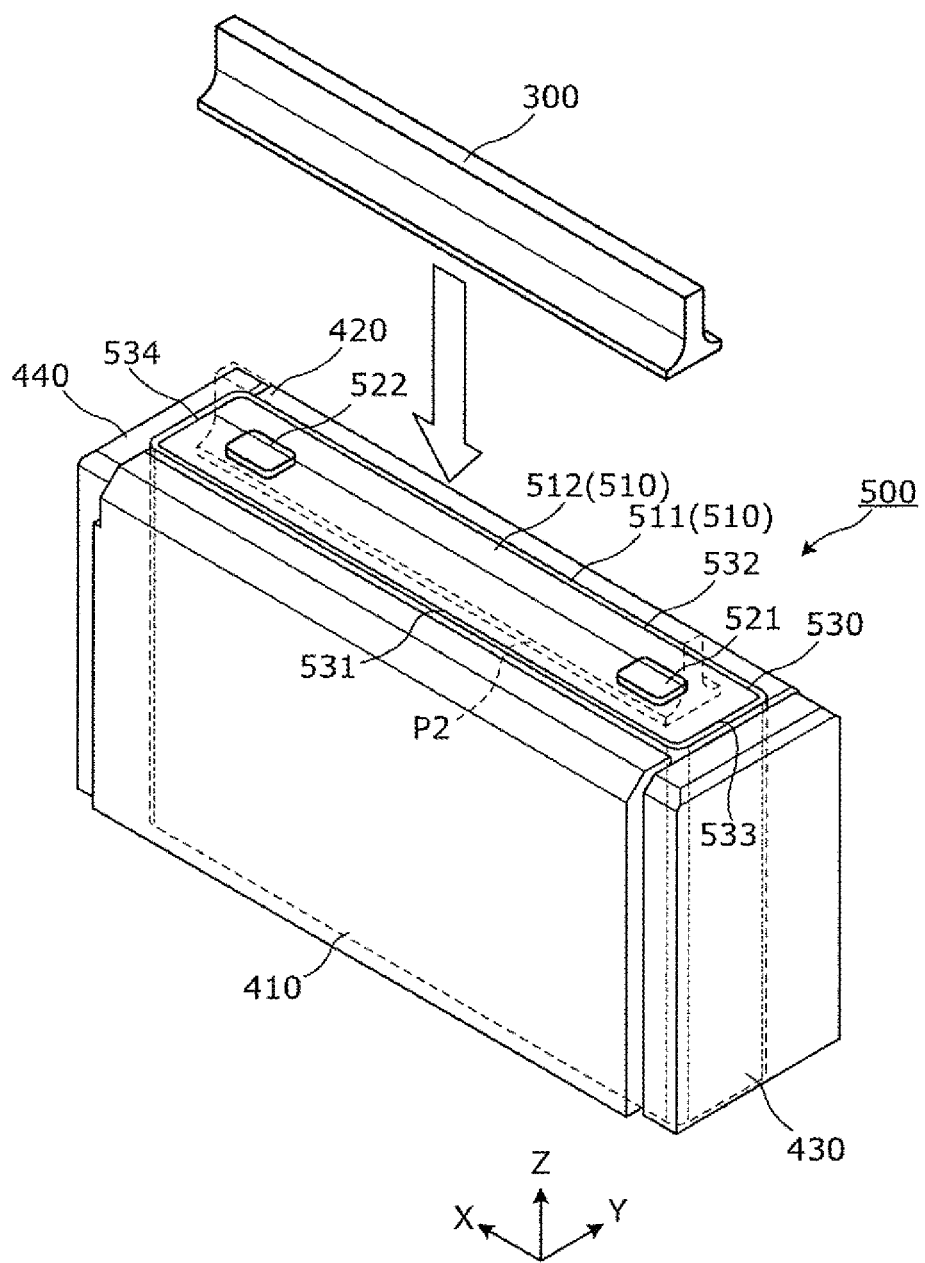
FIG. 2 is a view describing an arrangement of a jig in a method for manufacturing an energy storage device according to this embodiment.

FIG. 1 is a view showing an external appearance of an apparatus for manufacturing an energy storage device according to an embodiment. FIG. 2 is a view describing a jig and a plurality of fixing portions according to the embodiment. In these drawings and the following drawings, for the sake of convenience of the description, the Z axis direction is indicated as the vertical direction. Accordingly, in some places of the specification, the description is made by assuming the Z axis direction as the vertical direction (that is, assuming a plus side in the Z axis direction as the upper side, and a minus side in the Z axis direction as the lower side) hereinafter. However, in an actual use of the manufacturing apparatus, the Z axis direction is not limited to the vertical direction.

As shown in the drawing, the manufacturing apparatus 10 for manufacturing the energy storage device 500 includes: a welding unit 100; a plurality of (four in this embodiment) blow-off portions 210 to 240; a jig 300; and a plurality of (four in this embodiment) fixing portions 410 to 440. In this embodiment, the manufacturing apparatus 10 is an apparatus for welding a body 511 of a container 510 and a lid body 512 of the energy storage device 500 to each other. That is, in this embodiment, a part to be welded 530 which is a part of the container 510 of the energy storage device 500 to which welding is applied is a boundary portion between the body 511 and the lid body 512.

The welding unit 100 is a laser unit which applies welding to a container of the energy storage device 500 by irradiating a laser beam L1 (L2) to the container. To be more specific, the welding unit 100 irradiates a laser beam toward the part to be welded of the container from a predetermined position P1 (the position above the part to be welded) while changing an irradiation angle thus applying welding to the part to be welded. For example, the welding unit 100 applies welding to a portion of the part to be welded at an angle of the laser beam L1 and, thereafter, applies welding to another portion of the part to be welded at an angle of the laser beam L2. For example, the welding unit 100 includes a scanner unit (for example, a galvano scanner unit). The scanner unit includes a mirror disposed such that an angle of the mirror can be changed. The mirror is configured to reflect a laser beam such that the scanner unit scans a laser beam irradiated from the welding unit 100 while changing an angle of the laser beam.

Figure 3:
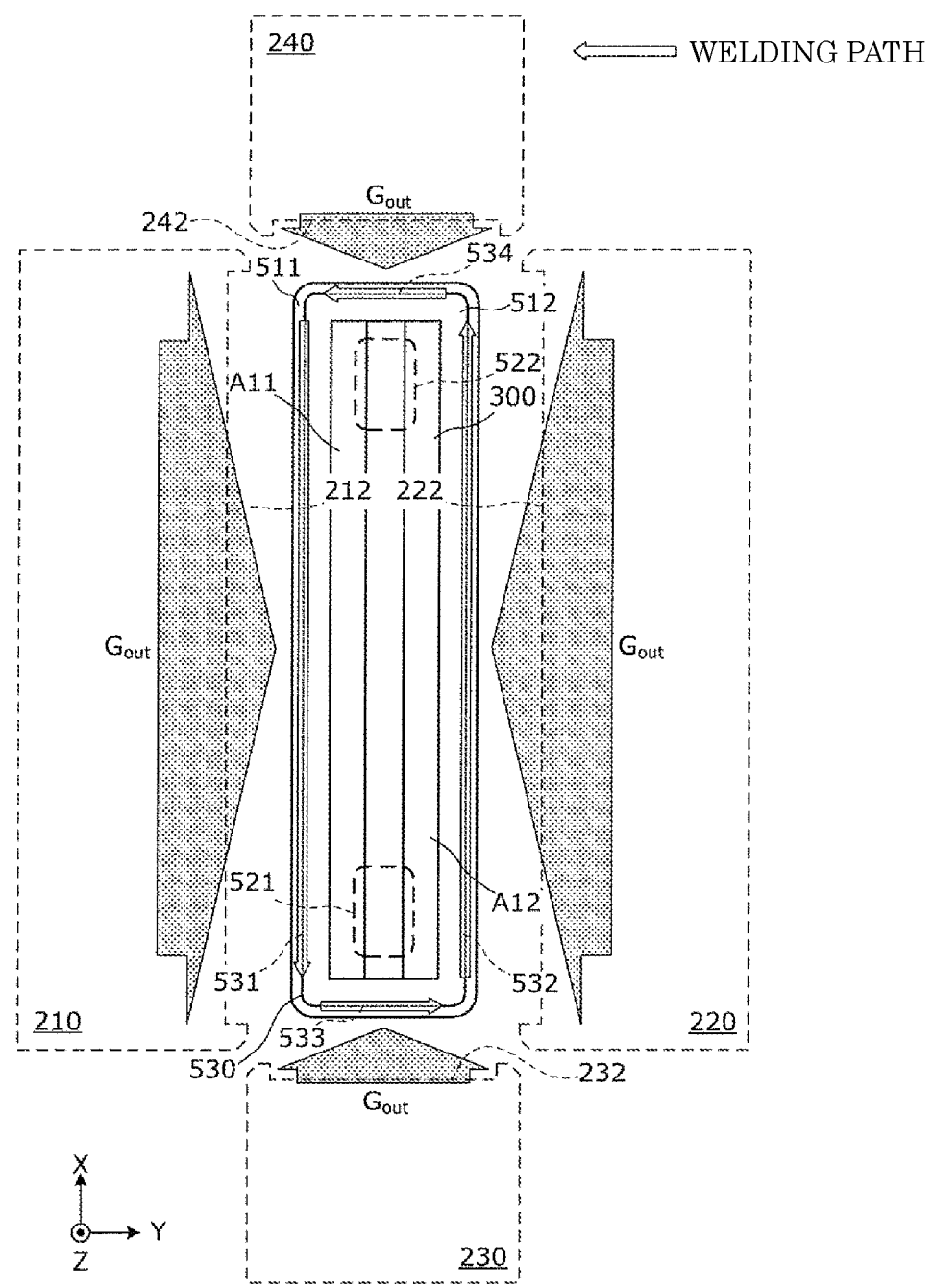
FIG. 3 is a view describing a welding path on a container of the energy storage device according to this embodiment.

In this embodiment, a path along which welding is applied by the welding unit 100 is described with reference to FIG. 3. FIG. 3 is a view describing a welding path on the container of the energy storage device according to this embodiment.

In this embodiment, as shown in FIG. 3, the welding unit 100 continuously applies welding to a long-side portion 531, a short-side portion 533, a long-side portion 532 and a short-side portion 534 in this order, for example. That is, the welding unit 100 applies welding to the container 510 by scanning a laser beam to the rectangular annular part to be welded 530 while changing an angle of the laser beam in one continuous irradiation of the laser beam.

The plurality of blow-off portions 210 to 240 supply shield gases toward the part to be welded 530 of the container 510 of the energy storage device 500. The plurality of blow-off portions 210 to 240 supply the shield gases toward an upper surface of the container 510 on which the part to be welded 530 is formed from both sides of the container 510 in the X axis direction and from both sides of the container 510 in the Y axis direction. To be more specific, two blow-off portions 210, 220 are arranged on both sides of the container 510 in the Y axis direction, and supply shield gases from both sides of the container 510 in the Y axis direction toward the part to be welded 530 on the upper surface of the container 510. On the other hand, two blow-off portions 230, 240 are arranged on both sides of the container 510 in the X axis direction, and supply shield gases from both sides of the container 510 in the X axis direction toward the part to be welded 530 on the upper surface of the container 510. Although a shield gas is not particularly limited provided that the shield gas is an inert gas which can prevent the oxidation caused by the exposure of metal at a welded part with outside air, an N2 gas, an Ar gas, a He gas or the like can be named, for example.

The plurality of blow-off portions 210 to 240 respectively have introducing ports 211, 221, 231, 241 through which shield gases are introduced, and blow-off ports 212, 222, 232, 242 through which the shield gases are blown off toward the part to be welded 530. The plurality of blow-off portions 210 to 240 also respectively have a function as a flow straightener which straightens the flow of the shield gas during a period that a gas Gin introduced from the introducing ports 211, 221, 231, 241 flows through flow passages ranging from the introducing ports 211, 221, 231, 241 to the blow-off ports 212, 222, 232, 242. That is, the gases Gout blown off from the plurality of blow-off portions 210 to 240 are gases which are straightened by the plurality of blow-off portions 210 to 240 so that the generation of a turbulent flow by the shield gases is reduced.

Figure 4:
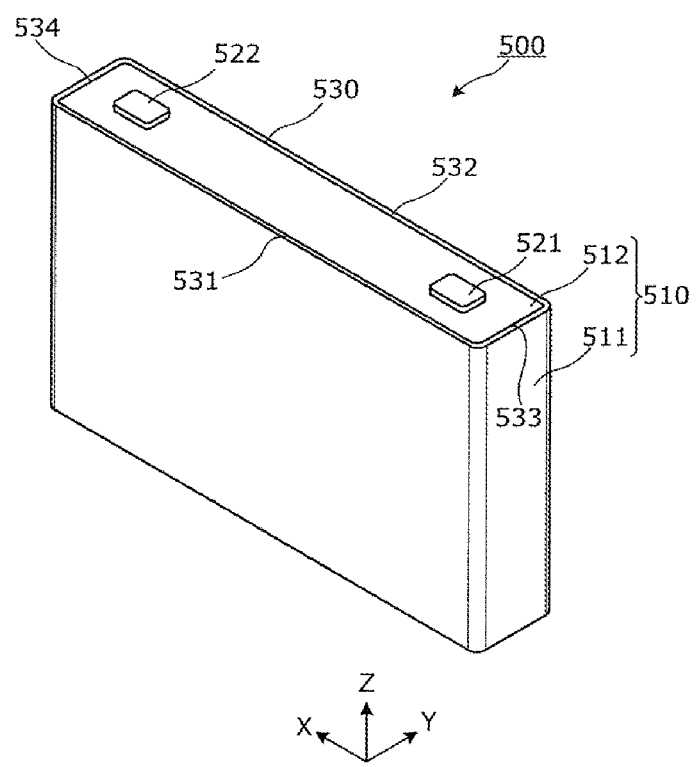
FIG. 4 is a perspective view showing an external appearance of the energy storage device according to the embodiment.

The detailed configuration of the energy storage device 500 which is an object to be welded is described with reference to FIG. 4. FIG. 4 is a perspective view showing an external appearance of the energy storage device according to the embodiment.

The energy storage device 500 is a secondary battery which can charge electricity or discharge electricity. To be more specific, the energy storage device 500 is a nonaqueous electrolyte secondary battery such as a lithium ion secondary battery. The energy storage device 500 is applicable to an electric vehicle (EV), a plug-in hybrid electric vehicle (PHEV), a hybrid electric vehicle (HEV) or the like, for example. The energy storage device 500 is not limited to a nonaqueous electrolyte secondary battery, and may be a secondary battery other than the nonaqueous electrolyte secondary battery, and may be a capacitor.

As shown in FIG. 4, the energy storage device 500 includes: a container 510 formed of a bottomed rectangular cylindrical body 511 and a lid body 512 which is a plate member for closing an opening of the body 511; a positive electrode terminal 521; and a negative electrode terminal 522. The lid body 512 is configured such that an outer edge portion of the plate-like lid body 512 opposedly faces an inner wall surface of the opening of the body 511 in a state where the lid body 512 closes the opening of the body 511. A stepped portion 511a (see FIG. 6) which supports a lower surface of the lid body 512 is formed on the opening of the body 511 so that an upper end portion of the body 511 and an upper surface of the lid body 512 are disposed at the same position (on the same plane). That is, the part to be welded 530 is formed on the upper surface of the container 510.

The container 510 is configured such that the inside of the container 510 can be hermetically sealed by joining the lid body 512 and the body 511 to each other by welding after an electrode assembly and the like are housed in the inside of the container 510. Although materials for forming the lid body 512 and the body 511 are not particularly limited, it is preferable that the lid body 512 and the body 511 be made of weldable metal such as stainless steel, aluminum or an aluminum alloy, for example.

The positive electrode terminal 521 and the negative electrode terminal 522 are mounted on the lid body 512. The positive electrode terminal 521 and the negative electrode terminal 522 are formed so as to project upward from the upper surface of the lid body 512. The positive electrode terminal 521 and the negative electrode terminal 522 are electrode terminals which are electrically connected to respective electrodes of the electrode assembly not shown in the drawing, and through which an electric power stored in the electrode assembly is discharged to the outside of the electrode assembly or through which an electric power from the outside of the electrode assembly is stored in the electrode assembly.

In the energy storage device 500 of this embodiment, the lid body 512 of the container 510 is an elongated plate member having two long sides extending parallel to the X axis direction and two short sides extending parallel to the Y axis direction. Accordingly, as shown in FIG. 3, the part to be welded 530 of the container 510 is a rectangular annular part which has a profile equal to a profile of the lid body 512 when viewed from above, and has two long-side portions 531, 532 extending parallel to the X axis direction and two short-side portions 533, 534 extending parallel to the Y axis direction.

In this embodiment, the blow-off portion 210 has the blow-off port 212 which opposedly faces the long-side portion 531 and has a width larger than a length of the long-side portion 531. In the same manner, the blow-off portion 220 has the blow-off port 222 which opposedly faces the long-side portion 532, and has a width larger than a length of the long-side portion 532. In short, two blow-off portions 210, 220 supply shield gases to two long-side portions 531, 532 of the part to be welded 530 extending parallel to the X axis direction from two different directions, and supply the shield gases over the entire two long-side portions 531, 532. Two blow-off portions 210, 220 supply the shield gases substantially at the same timing.

The blow-off portion 230 has the blow-off port 232 which opposedly faces the short-side portion 533 and has a width larger than a length of the short-side portion 533. In the same manner, the blow-off portion 240 has the blow-off port 242 which opposedly faces the short-side portion 534 and has a width larger than a length of the short-side portion 534. With such a configuration, two blow-off portions 230, 240 supply shield gases toward two respective short-side portions 533, 534 of the part to be welded 530 extending parallel to the Y axis direction, and supply the shield gases over the entire two short-side portions 533, 534. Two blow-off portions 230, 240 supply the shield gases substantially at the same timing.

Two blow-off portions 210, 220 and two blow-off portions 230, 240 supply shield gases substantially at the same timing. That is, four blow-off portions 210, 220, 230, 240 supply shield gases substantially at the same timing during substantially the same period.

The jig 300 is a jig for preventing collision of shield gases supplied from a plurality of different directions. As shown in FIG. 2, before welding is applied by the welding unit 100, the jig 300 is arranged at a predetermined position P2 on the upper surface of the container 510 of the energy storage device 500. In this embodiment, the predetermined position P2 is the position between two parts to be welded (two long-side portions 531, 532 in this embodiment) to which shield gases are supplied from two different directions. As shown in FIG. 3, the jig 300 has wall surfaces A11, A12 which opposedly face two long-side portions 531, 532 in a state where the jig 300 is arranged at the predetermined position P2. That is, the wall surfaces A11, A12 are wall surfaces for shielding shield gases. Although a material for forming the jig 300 is not particularly limited, the jig 300 is preferably made of a material having thermal conductivity so as to radiate heat generated due to applying of welding. It is also preferable that the jig 300 be made of a material having heat resistance against heat generated in the jig 300 due to applying of welding. The jig 300 is preferably made of a metal such as aluminum, an aluminum alloy, copper or a copper alloy, for example.

The plurality of fixing portions 410 to 440 are jigs provided for positioning the energy storage device 500 with respect to the welding unit 100. To be more specific, as shown in FIG. 2, two fixing portions 410, 420 opposedly face each other in the Y axis direction, and sandwich long side surfaces of the container 510 of the energy storage device 500 from both sides in the Y axis direction thus fixing the energy storage device 500 such that the energy storage device 500 is positioned at a predetermined position in the Y axis direction. Two fixing portions 430, 440 opposedly face each other in the X axis direction, and sandwich short side surfaces of the container 510 of the energy storage device 500 from both sides in the X axis direction thus fixing the energy storage device 500 such that the energy storage device 500 is positioned at a predetermined position in the X axis direction. The position of the energy storage device 500 in the Z axis direction is determined by placing the energy storage device 500 on a pedestal not shown in the drawing. As described above, the energy storage device 500 is fixed in a state where the energy storage device 500 is positioned at the predetermined positions in the X axis direction, the Y axis direction, and the Z axis direction by the plurality of fixing portions 410 to 440. Accordingly, even when another energy storage device 500 is fixed in place of the energy storage device 500, it is possible to establish a fixed positional relationship between another energy storage device 500 and the welding unit 100.

The configuration of the jig 300 is described in detail with reference to FIG. 5A and FIG. 5B.

Figure 5A:
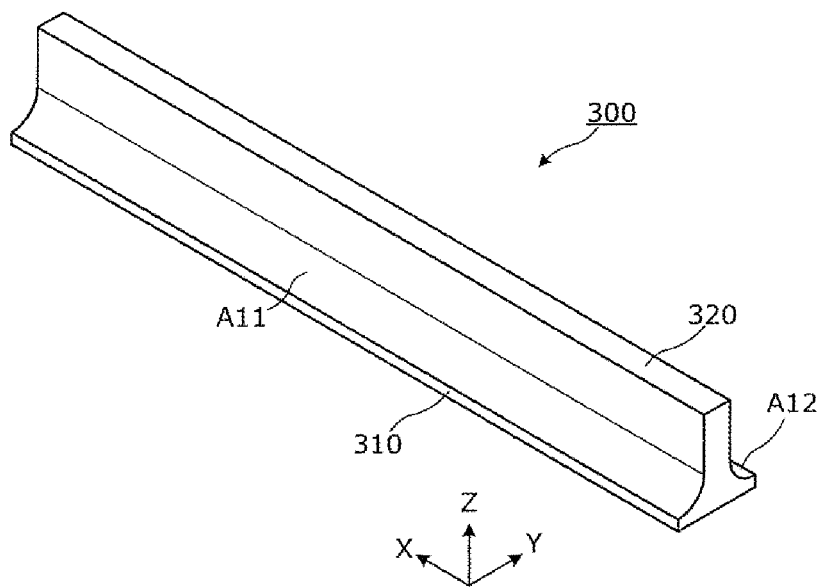
FIG. 5A is a perspective view of the jig according to the embodiment as viewed from an obliquely upward direction.

FIG. 5A is a perspective view of the jig according to the embodiment as viewed from an obliquely upward direction.

Figure 5B:
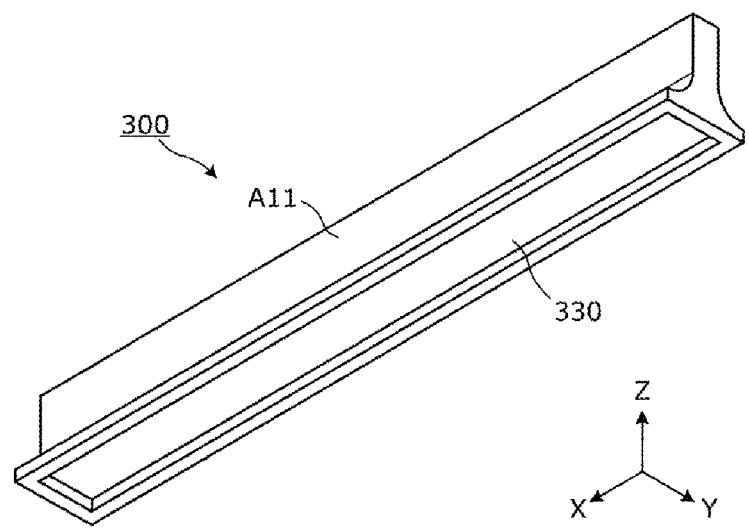
FIG. 5B is a perspective view of the jig according to the embodiment as viewed from an obliquely downward direction.

FIG. 5B is a perspective view of the jig according to the embodiment as viewed from an obliquely downward direction.

As shown in these drawings, the jig 300 includes: a proximal portion 310 disposed on the minus side in the Z axis direction; and a wall portion 320 projecting from the proximal portion 310 toward the plus side in the Z axis direction. The proximal portion 310 is a portion to be arranged on the upper surface of the container 510. In this embodiment, although the proximal portion 310 has side surfaces directed in the Y axis direction, the proximal portion 310 may not have the side surfaces. The wall portion 320 has the wall surfaces A11, A12. A profile of the jig 300 may be any shape provided that irradiation of a laser beam to a part to be welded is not interrupted when the jig 300 is arranged on the container 510 and welding is applied to the container 510 by a laser beam.

As shown in FIG. 5B, a groove portion 330 is formed on a lower surface of the proximal portion 310 of the jig 300. The groove portion 330 has a shape which allows the arrangement of the jig 300 while preventing the interference of the jig 300 with the positive electrode terminal 521 and the negative electrode terminal 522 when the jig 300 is arranged on the upper surface of the energy storage device 500. With such a configuration, the positive electrode terminal 521 and the negative electrode terminal 522 can be accommodated in the groove portion 330 formed on the proximal portion 310 of the jig 300. Accordingly, the jig 300 can be arranged at the predetermined position P2 on the container 510 in a state where the lower surface of the jig 300 is brought into contact with the upper surface of the container 510. As described above, the positive electrode terminal 521 and the negative electrode terminal 522 can be accommodated in the jig 300 and hence, the impingement of shield gases on the positive electrode terminal 521 and the negative electrode terminal 522 can be prevented whereby it is possible to reduce the generation of a turbulent flow in flows of shield gases.

Figure 6:
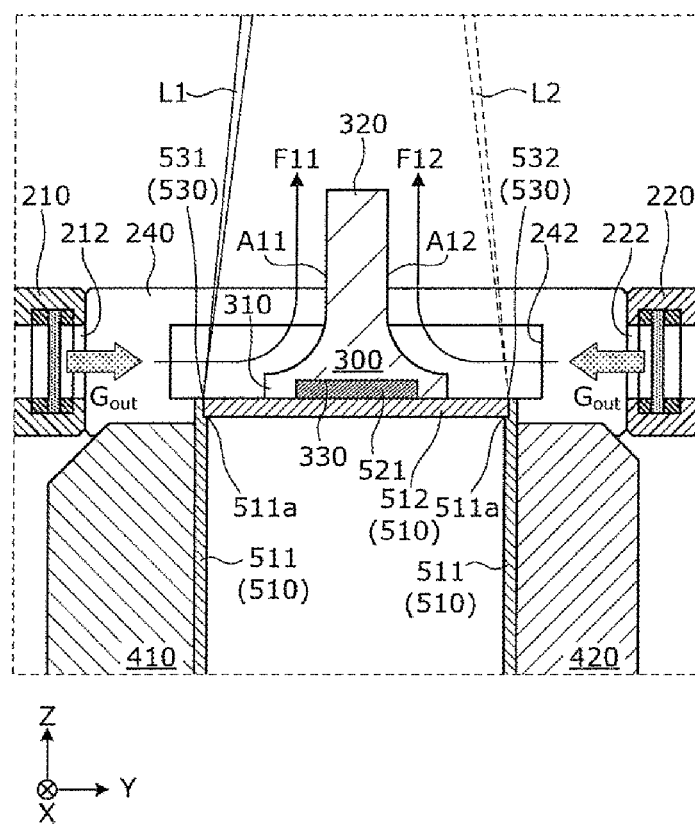
FIG. 6 is a partially enlarged view of the jig and an area around the jig in a cross-sectional view of the manufacturing apparatus according to the embodiment in FIG. 1 taken along a line VI-VI.

It is preferable for the groove portion 330 to have a size that the jig 300 is brought into contact with side surfaces of the positive electrode terminal 521 and the negative electrode terminal 522 on both sides in the X axis direction (a side surface of the positive electrode terminal 521 on the minus side in the X axis direction and a side surface of the negative electrode terminal 522 on the plus side in the X axis direction) and side surfaces of the positive electrode terminal 521 and the negative electrode terminal 522 on both sides in the Y axis direction so that the jig 300 is positioned in the X axis direction and in the Y axis direction. In this case, the size of the groove portion 330 may be set such that predetermined gaps are formed between the jig 300 and the side surfaces of the positive electrode terminal 521 and the negative electrode terminal 522 on both sides in the X axis direction and between the jig 300 and the side surfaces of the positive electrode terminal 521 and the negative electrode terminal 522 on both sides in the Y axis direction. It is sufficient for the groove portion 330 to have a depth larger than heights of the positive electrode terminal 521 and the negative electrode terminal 522. In FIG. 6 which is described later, the above-mentioned predetermined gaps are omitted. As described above, by forming the groove portion 330 with the size which prevents the jig 300 from being brought into contact with the positive electrode terminal 521 and the negative electrode terminal 522 in a state where the jig 300 is arranged at the predetermined position P2 on the container 510, it is possible to prevent heat generated due to applying of laser welding from being transferred to the positive electrode terminal 521 and the negative electrode terminal 522.

When a countermeasure is taken for preventing the transmission of heat generated by laser welding, the jig 300 may be configured to be brought into contact with the positive electrode terminal 521 and the negative electrode terminal 522. As the countermeasure for preventing the transmission of heat generated by laser welding, it is possible to provide a heat insulating material between the groove portion 330 formed on the jig 300 and the positive electrode terminal 521 and the negative electrode terminal 522 in a state where the jig 300 is arranged at the predetermined position P2 on the container 510, for example. That is, the jig 300 may have the heat insulating material disposed along a surface of the groove portion 330.

Next, with reference to FIG. 6, the description is made with respect to flows of shield gases when the shield gases are supplied from the plurality of blow-off portions 210 to 240 in a state where the jig 300 is arranged at the predetermined position P2 on the container 510 of the energy storage device 500.

FIG. 6 is a partially enlarged view of the jig and an area around the jig in a cross-sectional view of the manufacturing apparatus according to the embodiment in FIG. 1 taken along a line VI-VI.

As shown in FIG. 6, two blow-off portions 210, 220 disposed opposite to each other in the Y axis direction supply shield gases toward the parts to be welded 530 in a state where two blow-off portions 210, 220 sandwich the parts to be welded 530 therebetween in the Y axis direction. That is, two blow-off portions 210, 220 supply shield gases toward two parts to be welded from two different directions. To be more specific, the blow-off portion 210 arranged on the minus side in the Y axis direction of the energy storage device 500 supplies a shield gas toward the long-side portion 531 forming a portion of the part to be welded 530 on the minus side in the Y axis direction. The blow-off portion 220 arranged on the plus side in the Y axis direction of the energy storage device 500 supplies a shield gas toward the long-side portion 532 forming a portion of the part to be welded 530 on the plus side in the Y axis direction.

Two blow-off portions 210, 220 supply shield gases to a space at a height which is a predetermined distance away from the upper surface of the energy storage device 500 of the container 510 on which the part to be welded 530 is formed. To be more specific, two blow-off portions 210, 220 are arranged such that lower ends of the blow-off ports 212, 222 through which shield gases are blown off are at the same height as the upper surface of the container 510. In general, the flow of a gas blown off from an opening spreads in the width direction of the flow thus becoming the flow having a width larger than a size of the opening. That is, by arranging the lower ends of the blow-off ports 212, 222 which are openings at the same height as the upper surface of the container 510, it is possible to realize a state where the shield gases flow while being brought into contact with the upper surface of the container 510 with certainty.

With respect to the above-mentioned flow of shield gases described with reference to FIG. 6, the same goes for two blow-off portions 230, 240 disposed opposite to each other in the X axis direction.

In this embodiment, a flow F11 of a shield gas supplied by the blow-off portion 210 passes through an area above the long-side portion 531 and, thereafter, impinges on the wall surface A11 of the wall portion 320 of the jig 300. Accordingly, the direction of the flow F11 of the shield gas flowing along the horizontal direction (Y axis direction) is changed along the wall surface A11, and the flow F11 is directed in the upward direction (the plus side in the Z axis direction). In the same manner, a flow F12 of a shield gas supplied by the blow-off portion 220 passes through an area above the long-side portion 532 and, thereafter, impinges on the wall surface A12 of the wall portion 320 of the jig 300. Accordingly, the direction of the flow F12 of the shield gas flowing along the horizontal direction (Y axis direction) is changed along the wall surface A12, and the flow F12 is directed in the upward direction (the plus side in the Z axis direction).

That is, the shield gases blown off from the blow-off portions 210, 220 flow while the flow directions of the shield gases are changed by the jig 300 by a predetermined angle (by 90 degrees in this embodiment). With such a configuration, the shield gases flow along surfaces of the jig 300 at least until the shield gases reach an end portion of the jig 300 on the plus side in the Z axis direction.

The flow directions of the shield gases blown off from two different directions are changed by the jig 300 so that the shield gases flow in the same direction (toward the plus side in the Z axis direction). As described above, the jig 300 can make the flow directions of the shield gases blown off from two different directions uniform. Accordingly, it is possible to effectively prevent the generation of a turbulent flow which may be caused by the collision of the shield gases blown off from two different directions.

In this embodiment, as shown in FIG. 6, the wall portion 320 of the jig 300 is formed such that a distance between the wall surface A11 and the wall surface A12 is gradually reduced as the wall portion 320 extends toward the plus side in the Z axis direction. That is, portions of the wall surfaces A11, A12 are inclined with respect to the Y axis direction that shield gases flow. To be more specific, the portions of the wall surfaces A11, A12 are inclined with respect to the direction that the shield gases flow such that the portions of the wall surfaces A11, A12 are disposed more away from the lid body 512 as the portions of the wall surfaces A11, A12 extend to the downstream side in the direction that the shield gases flow.

In this embodiment, the wall surface A11 and the wall surface A12 are formed such that portions of the wall surface A11 and the wall surface A12 on the plus side in the Z axis direction are raised at a steeper angle than portions of the wall surface A11 and the wall surface A12 on the minus side in the Z axis direction. Further, the wall surface A11 and the wall surface A12 are formed substantially orthogonal to the lid body 512 at portions of the wall surface A11 and the wall surface A12 on the plus side in the Z axis direction. That is, it is also safe to say that the inclined surfaces are curved bent surfaces, and are curved such that the inclined surfaces project toward the inside of the wall surface A11 and the wall surface A12.

The jig 300 is configured such that a height from the upper surface of the container 510 is higher than heights of the plurality of blow-off portions 210 to 240 from the blow-off ports 212, 222, 232, 242 in a state where the jig 300 is arranged at the predetermined position P2 on the container 510. With such a configuration, it is possible to prevent the collision of shield gases blown off from the blow-off ports 212, 222, 232, 242 at the part to be welded 530.

Figure 7:
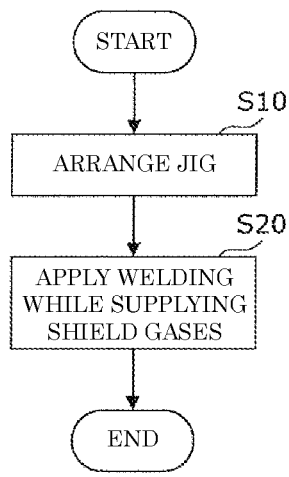
FIG. 7 is a flowchart showing a method for manufacturing an energy storage device according to the embodiment.

Next, a method for manufacturing an energy storage device which uses the jig 300 having the above-mentioned configuration is described with reference to FIG. 7. FIG. 7 is a flowchart showing a method for manufacturing an energy storage device according to the embodiment. In the method for manufacturing the energy storage device 500, assume that the energy storage device 500 is already positioned by the plurality of fixing portions 410 to 440.

First, the jig 300 is arranged at the predetermined position P2 on the upper surface of the energy storage device 500 of the container 510 (S10: arranging step). To be more specific, the jig 300 on which the wall surfaces A11, A12 are formed is arranged between two long-side portions 531, 532 of the container 510 to which welding is applied. In the arranging step S10, it is preferable that the jig 300 be arranged between two long-side portions 531, 532 in a state where the jig 300 is brought into contact with two long-side portions 531, 532. The arranging step S10 may be performed by the manufacturing apparatus 10 or manually by an operator (human). For example, the manufacturing apparatus 10 may have a mechanism for moving the jig 300 to the predetermined position P2 on the container 510, and the manufacturing apparatus 10 may perform the arranging step S10 by using the mechanism.

Next, welding is applied to the part to be welded 530 while supplying shield gases toward the part to be welded 530 (S20: welding step). To be more specific, the plurality of blow-off portions 210 to 240 supply shield gases toward two long-side portions 531, 532 and two short-side portions 533, 534 of the part to be welded 530 from four different directions. In the welding step S20, shield gases supplied to the part to be welded impinge on the inclined surfaces (bent surfaces) of the jig 300 and flow along the inclined surfaces. The welding unit 100 applies welding to the part to be welded 530 in a state where shield gases are supplied to the part to be welded 530.

As has been described heretofore, in the method for manufacturing the energy storage device 500 according to the embodiment of the present invention, the jig 300 on which the wall surfaces are formed is arranged between two long-side portions 531, 532 to which welding is applied, and welding is applied to two long-side portions 531, 532 while supplying shield gases to two long-side portions 531, 532 from two different directions.

That is, the respective flows F11, F12 of the shield gases which are supplied toward two long-side portions 531, 532 from two different directions pass through the respective long-side portions 531, 532 and, thereafter, the directions of the flows F11, F12 are changed by the respective wall surfaces A11, A12 of the jig 300. To be more specific, the flows F11, F12 are directed in the direction away from the container 510. That is, by arranging the jig 300 between two long-side portions 531, 532, it is possible to prevent merging of two flows F11, F12 of the shield gases at two long-side portions 531, 532. With such a configuration, the generation of a turbulent flow by the shield gases at two long-side portions 531, 532 can be reduced and hence, it is possible to form a stable shield gas atmosphere at two long-side portions 531, 532. Accordingly, the occurrence of defective welding can be reduced.

In welding step S20, the shield gases supplied to the part to be welded 530 flows along the inclined surfaces forming the portions of the wall surfaces A11, A12 of the jig 300. With such a configuration, it is possible to make two respective flows F11, F12 of the shield gases supplied from two different directions easily flow along the respective wall surfaces A11, A12 of the jig 300. Accordingly, the directions that two respective flows F11, F12 of the shield gases flow can be changed so as to prevent the generation of a turbulent flow. Accordingly, it is possible to form a stable shield gas atmosphere at two long-side portions 531, 532 and hence, the occurrence of defective welding can be reduced.

In the arranging step S10, the jig 300 is arranged in a state where the jig 300 is brought into contact with the container 510. With such a configuration, it is possible to prevent merging of two flows F11, F12 of the shield gases supplied from two directions at two long-side portions 531, 532. Further, heat generated in the container 510 by welding can be transferred to the jig 300 and hence, two parts to be welded can be cooled.

In the welding step S20, welding is applied to two long-side portions 531, 532 by irradiating the laser beam L1 toward two long-side portions 531, 532 from a predetermined position while changing an irradiation angle.

Conventionally, in the case where a torch or a work piece is movable, a gas nozzle from which a shield gas is blown off is mounted on a laser head or the like and hence, the gas nozzles follows the movement of a laser beam, and the gas nozzle supplies a shield gas to a welded part. In recent years, in place of laser welding where welding is performed by moving a torch or a work piece, laser welding using a galvano scanner has become a mainstream, for example. In the case of welding using the galvano scanner, by operating a mirror disposed in the inside of the galvano scanner, a laser beam is irradiated. In this case, it is difficult to move a gas nozzle following the laser beam and hence, it is necessary to supply a shield gas from a periphery of a work piece.

However, in the case where a shield gas is supplied from a periphery of a work piece, shield gases to be supplied collide with each other so that the flows of gases generate a turbulent flow. Accordingly, a portion where shielding is not sufficiently applied to a molten pool may be generated at a welded part thus adversely affecting a quality of welding. However, even in such a case where welding is applied to two long-side portions 531, 532 by scanning the laser beam L1 and shield gases are supplied from two different directions, the jig 300 is arranged between two long-side portions 531, 532 in this embodiment and hence, it is possible to form a stable shield gas atmosphere at two long-side portions 531, 532.

Further, the manufacturing apparatus 10 for manufacturing the energy storage device 500 has two blow-off ports 212, 222 through which shield gases are supplied to two long-side portions 531, 532 from two different directions. With such a configuration, it is possible to easily supply shield gases to two long-side portions 531, 532.

Portions of the wall surfaces A11, A12 are inclined with respect to the direction that the shield gases flow. As described above, the directions of two respective flows of the shield gases supplied from two different directions are changed by making two respective flows of the shield gases flow along the inclined surfaces of the jig 300. Accordingly, it is possible to prevent the generation of a turbulent flow which may be caused due to the impingement of the flows of the shield gases on the wall surfaces of the jig. With such a configuration, it is possible to form a stable shield gas atmosphere at two long-side portions 531, 532 and hence, the occurrence of defective welding can be reduced.

The container 510 includes the body 511 having a rectangular opening and the elongated plate-like lid body 512 which closes the opening. Two parts to be welded form two long-side portions 531, 532 disposed opposite to each other out of a rectangular annular boundary portion (part to be welded 530) between the body 511 and the lid body 512. The jig 300 is arranged between two long-side portions 531, 532. That is, at two portions which are disposed opposite to each other out of the rectangular annular boundary portion between the body 511 and the lid body 512 which form the part to be welded 530, the jig is arranged between two long-side portions 531, 532 which define a short distance therebetween and respectively have a long welding distance. Accordingly, it is possible to prevent merging of shield gases supplied from two different directions.

The portions of the wall surfaces A11, A12 are inclined with respect to the direction that the shield gases flow such that the portions of the wall surfaces A11, A12 are disposed more away from the container 510 as the portions of the wall surfaces A11, A12 extend to the downstream side in the direction that the shield gases flow. That is, the directions that the shield gases flow can be changed to the directions away from the container 510 and hence, it is possible to prevent merging of the shield gases supplied from two different directions at two long-side portions 531, 532 of the container 510.

Although the method for manufacturing the energy storage device 500 and the manufacturing apparatus 10 for manufacturing the energy storage device 500 according to the embodiment of the present invention have been described heretofore, the present invention is not limited to the above-mentioned embodiment. That is, it should be construed that the embodiment disclosed in this specification is only for an exemplifying purpose in all aspects and is not limited. The scope of the present invention is not defined by the above-mentioned description but is defined by Claims, and it is intended that all modifications which fall within the meaning and the scope equivalent to Claims are also included in the scope of the present invention.

Figure 8:
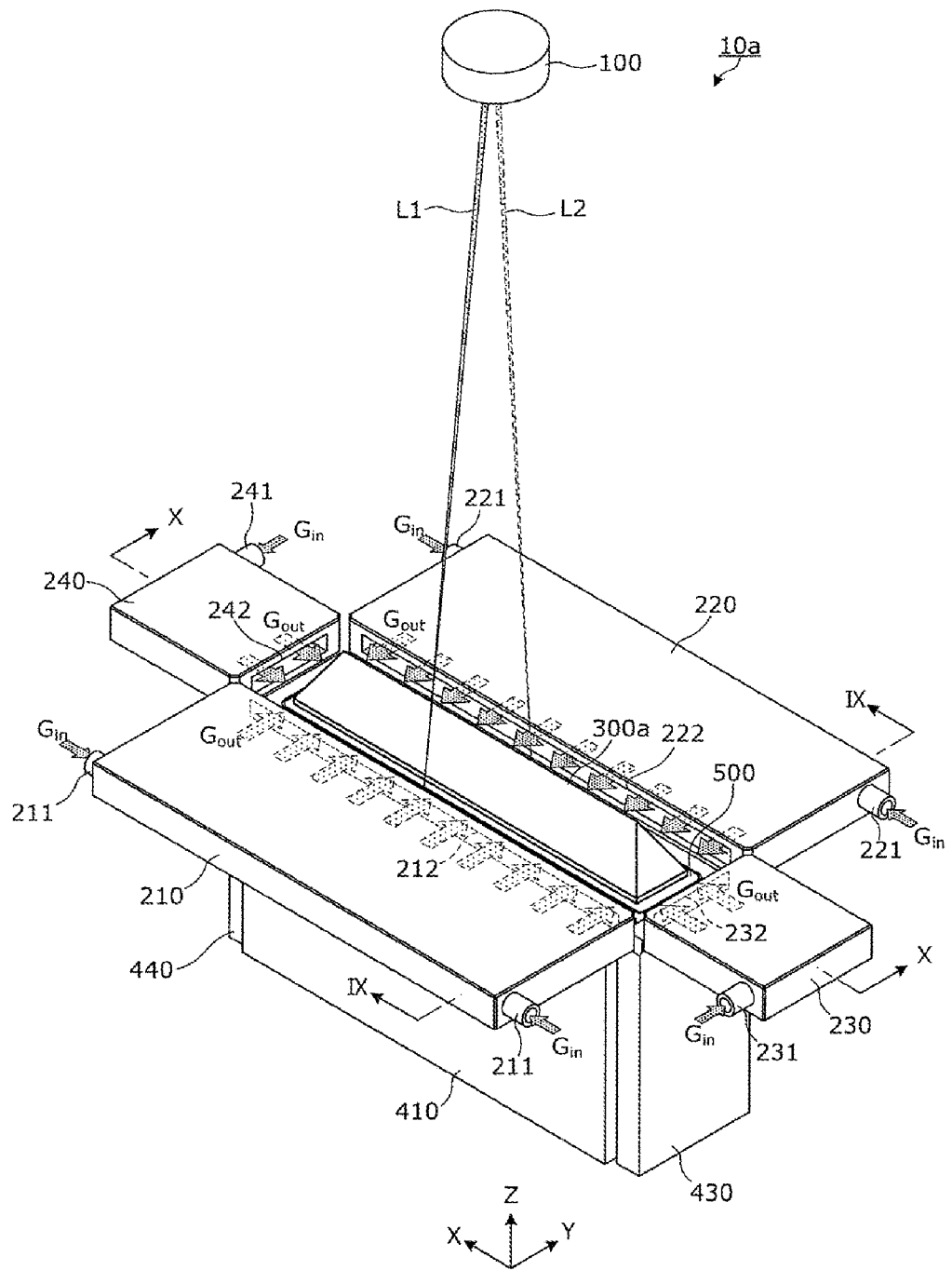
FIG. 8 is a view showing an external appearance of an apparatus for manufacturing an energy storage device according to a modification.
Figure 9:
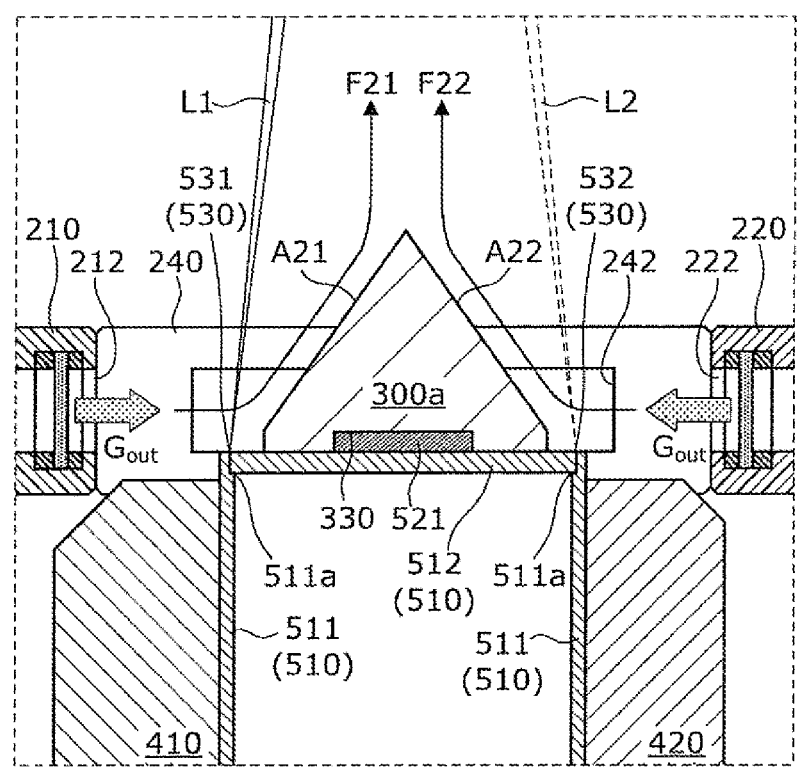
FIG. 9 is a partially enlarged view of a jig and an area around the jig in a cross-sectional view of the manufacturing apparatus in FIG. 8 taken along a line IX-IX.
Figure 9:
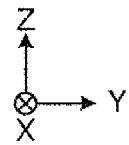
Figure 10:
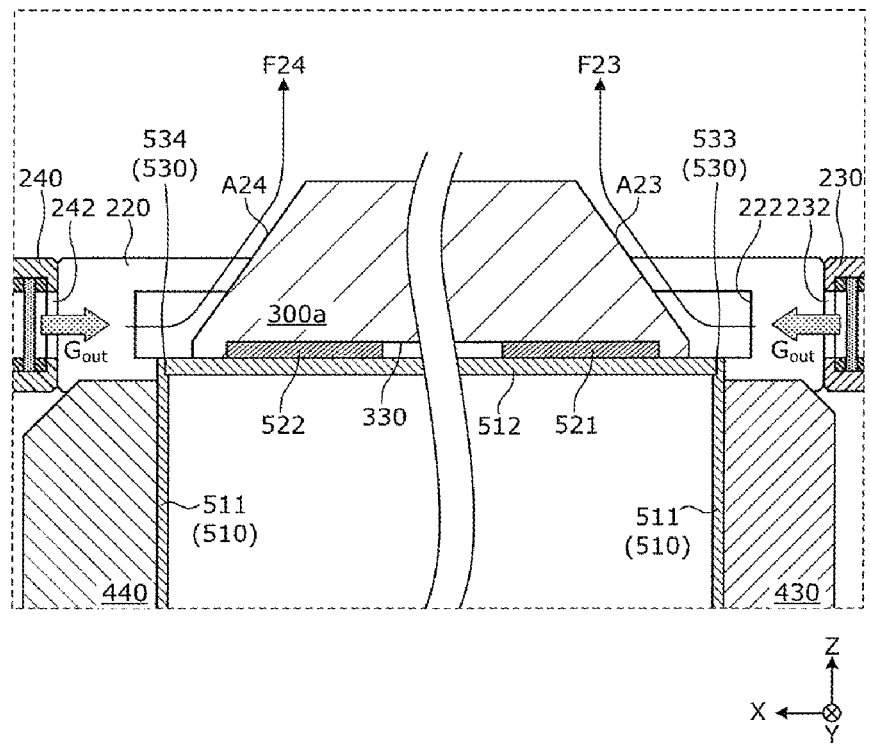
FIG. 10 is a partially enlarged view of a jig and an area around the jig in a cross-sectional view of the manufacturing apparatus in FIG. 8 taken along a line X-X.

For example, in the above-mentioned embodiment, the jig 300 having the wall surfaces A11, A12 which include surfaces inclined with respect to the Y axis direction is adopted. However, the present invention is not limited to the jig 300 having such a configuration. As shown in FIG. 8 to FIG. 10, it may be possible to adopt a jig 300a having wall surfaces A23, A24 which include surfaces inclined with respect to the X axis direction in addition to the wall surface A21, A22 which include surfaces inclined with respect to the Y axis direction.

FIG. 8 is a view showing an external appearance of an apparatus for manufacturing an energy storage device according to a modification. FIG. 9 is a partially enlarged view of a jig and an area around the jig in a cross-sectional view of the manufacturing apparatus in FIG. 8 taken along a line IX-IX. FIG. 10 is a partially enlarged view of a jig and an area around the jig in a cross-sectional view of the manufacturing apparatus in FIG. 8 taken along a line X-X. The configuration of a manufacturing apparatus 10a in FIG. 8 other than a jig 300a is substantially the same as the configuration of the above-described manufacturing apparatus 10 other than the jig 300. Accordingly, the identical configurational elements are given the same symbols, and the description of such configurational elements is omitted.

As shown in FIG. 9, the jig 300a is formed such that a distance between the wall surface A21 and the wall surface A22 is gradually reduced as the wall surface A21 and the wall surface A22 extend to the plus side in the Z axis direction. That is, the jig 300a has surfaces inclined with respect to the Y axis direction that shield gases flow. Further, as shown in FIG. 10, the jig 300a is formed such that a distance between the wall surface A23 and the wall surface A24 is gradually reduced as the wall surface A23 and the wall surface A24 extend to the plus side in a Z axis. That is, the jig 300a has surfaces inclined with respect to the X axis direction that shield gases flow.

With the use of the jig 300a having such a profile, shield gases supplied to the part to be welded 530 from four directions flow as shown in FIG. 9 and FIG. 10.

As shown in FIG. 9, a flow F21 of a shield gas supplied by the blow-off portion 210 passes through an area above the long-side portion 531 and, thereafter, impinges on the wall surface A21 of the jig 300a. Accordingly, the direction of the flow F21 of the shield gas flowing along the horizontal direction (Y axis direction) is changed along the wall surface A21, and the flow F21 is directed in the upward direction (the plus side in the Z axis direction). In the same manner, a flow F22 of a shield gas supplied by the blow-off portion 220 passes through an area above the long-side portion 532 and, thereafter, impinges on the wall surface A22 of the jig 300a. Accordingly, the direction of the flow F22 of the shield gas flowing along the horizontal direction (Y axis direction) is changed along the wall surface A22, and the flow F22 is directed in the upward direction (the plus side in the Z axis direction).

Further, as shown in FIG. 10, a flow F23 of a shield gas supplied by the blow-off portion 230 passes through an area above the short-side portion 533 and, thereafter, impinges on the wall surface A23 of the jig 300a. Accordingly, the flow F23 of the shield gas flowing along the horizontal direction (X axis direction) is directed in the upward direction (the plus side in the Z axis direction) along the wall surface A23. In the same manner, a flow F24 of a shield gas supplied by the blow-off portion 240 passes through an area above the short-side portion 534 and, thereafter, impinges on the wall surface A24 of the jig 300a. Accordingly, the flow F24 of the shield gas flowing along the horizontal direction (X axis direction) is directed in the upward direction (the plus side in the Z axis direction) along the wall surface A24.

That is, the respective shield gases blown off from the blow-off portions 210, 220, 230, 240 flow with the flow directions of the shield gases changed by the jig 300a by predetermined angles (by 90 degrees in this embodiment). With such a configuration, the shield gases flow along surfaces of the jig 300a until the shield gases reach an end portion of the jig 300a on the plus side in the Z axis direction.

The flow directions of the shield gases blown off from four different directions are changed by the jig 300a so that the shield gases flow in the same direction (toward the plus side in the Z axis direction). As described above, the jig 300a can make the flow directions of the shield gases blown off from four different directions uniform. Accordingly, it is possible to effectively prevent the generation of a turbulent flow which may be caused by the collision of the shield gases blown off from four different directions.

As described above, with the use of the jig 300a having the wall surfaces A21 to A24 disposed opposite to each other on four different directions, it is possible to make the flows of shield gases supplied from four different directions directed upward. Accordingly, it is possible to prevent merging of the shield gases at the part to be welded 530 and hence, it is possible to reduce the generation of a turbulent flow at the part to be welded.

The method for manufacturing an energy storage device according to the above-mentioned embodiment includes two steps consisting of the arranging step S10 and the welding step S20. However, the method may further include a cooling step of cooling the jig 300, 300a. For example, irregularities may be formed on wall surfaces of the jig in the Y axis direction so as to enhance heat transfer characteristics so that a heat exchange is performed between the jig and shield gases whereby the jig is cooled by the shield gases. To be more specific, it may be possible to adopt a jig where a heat transfer characteristic is enhanced by forming a groove extending along the direction that a shield gas flows on the jig. When the manufacturing apparatus includes a portion for holding the jig, the jig may be cooled by allowing a refrigerant such as water to flow in the portion for holding the jig. For example, a flow passage through which a refrigerant such as water flows may be formed on the jig per se so as to cool the jig by the refrigerant. The cooling step may be performed when the welding step is performed, or may be performed at different timing.

As described above, by further cooling the jig, heat generated by welding and transferred to the jig can be radiated to the outside and hence, it is possible to prevent the jig from becoming a high temperature even when the jig is repeatedly used. Accordingly, during welding of the container of the energy storage device, it is possible to prevent the jig at a high temperature from adversely affecting the energy storage device by being brought into contact with the container. Further, the degradation of the jig caused by a change in temperature can be prevented and hence, a lifetime of the jig can be prolonged.

In the above-mentioned embodiment, the jig 300 has the groove portion 330 which encloses both the positive electrode terminal 521 and the negative electrode terminal 522 in a state where the jig 300 is arranged at the predetermined position P2 on the container 510. However, the present invention is not limited to the groove portion 330 having such a configuration. That is, two recessed portions which enclose the positive electrode terminal 521 and the negative electrode terminal 522 respectively may be formed in the jig 300. Further, in the case where a portion which projects from the lid portion of the energy storage device toward the outside is formed on the lid portion, a groove portion or a recessed portion may be formed in the jig 300 such that the groove portion or the recessed portion enclose not only the positive electrode terminal 521 and the negative electrode terminal 522 but also such a projecting portion.

In the above-mentioned embodiment, the part to be welded 530 of the container 510 of the energy storage device 500 to which welding is applied is the boundary portion between the body 511 and the lid body 512. However, the present invention is not limited to such a configuration. When welding is applied to another portion of the container, the method for manufacturing an energy storage device and the apparatus for manufacturing an energy storage device according to the present invention are also applicable to another portion of the container. For example, the present invention is applicable to the case where welding is performed so as to form side surfaces of the container, and is also applicable to the case where welding is performed so as to form a bottom surface of the container.

In the above-mentioned embodiment, four respective blow-off portions 210 to 240 supply shield gases to four portions 531 to 534 of the part to be welded 530 thus forming a shield gas atmosphere at the part to be welded 530. However, it is not always necessary that four blow-off portions 210 to 240 supply shield gases. For example, only two blow-off portions 210, 220 may supply shield gases to two long-side portions 531, 532 out of the part to be welded 530. That is, in the welding step, it is sufficient that welding be applied to two parts to be welded while supplying shield gases to two parts to be welded from two different directions which correspond to two parts to be welded.

In the above-mentioned embodiment, two long-side portions 531, 532 of the part to be welded 530 are disposed parallel to each other with a predetermined distance therebetween. However, provided that two long-side portions 531, 532 are separated from each other with a predetermined distance therebetween, two long-side portions 531, 532 may not be disposed parallel to each other. The part to be welded 530 has an approximately rectangular shape. However, the shape of the part to be welded 530 is not limited to such a shape, and may be an elongated circular shape, an elliptical shape, or a circular shape.

In the above-mentioned embodiment, the lid body 512 is arranged so as to opposedly face the inner wall surface of the opening of the body 511, the part to be welded 530 is formed on the upper surface of the container 510, and welding is performed by scanning a laser beam from the upward direction (Z axis direction). However, the present invention is not limited to such a configuration. For example, the present invention may be applied to a container where the lid body may be arranged on an upper end of the body portion, and welding is performed by irradiating a laser beam from the horizontal direction (the X axis direction and the Y axis direction). In this case, a plurality of welding units each of which irradiates a laser beam may be disposed on sides of the container in the horizontal direction and laser beams may be scanned from a plurality of directions. The present invention is not limited to the method where a laser beam is scanned, and is also applicable to a method where welding is performed by moving a laser head which irradiates a laser beam. The present invention is also applicable to a method where welding is performed by moving a pedestal per se on which the container is fixedly mounted. Further, by providing a mirror for reflecting a laser beam irradiated from the upward direction in the horizontal direction on whole sides of the lid body of the container respectively, welding can be also realized by the method where a laser beam is irradiated from the upward direction as described in the above-mentioned embodiment.

In the above-mentioned embodiment and the modification of the embodiment, the wall surfaces A11, A12, A21 to A24 of the jig 300, 300*a* are inclined with respect to the flow directions of the shield gases. However, the wall surfaces A11, A12, A21 to A24 of the jig 300, 300*a* may not be inclined with respect to the flow directions of the shield gases. That is, provided that a jig can prevent merging of shield gases supplied from different directions at the part to be welded, the jig may have wall surfaces perpendicular to the flow directions of the shield gases.

In the above-mentioned embodiment and the modifications of the embodiment, the plurality of blow-off portions 210 to 240 supply shield gases toward the part to be welded 530 of the container 510 of the energy storage device 500 from both sides in the X axis direction and both sides in the Y axis direction in the direction along the X axis direction or the Y axis direction. However, the shield gases may not be supplied in the direction along the X axis direction or the Y axis direction.

For example, the plurality of blow-off portions 210 to 240 may supply shield gases toward the part to be welded 530 from positions on both sides of the part to be welded 530 in the X axis direction and on the plus side in the Z axis direction, and from positions on both sides of the part to be welded 530 in the Y axis direction and on the plus side in the Z axis direction (that is, in the obliquely upward directions). Further, for example, the plurality of blow-off portions 210 to 240 may supply shield gases toward the part to be welded 530 from positions on both sides of the part to be welded 530 in the X axis direction and on the minus side in the Z axis direction, and from positions on both sides of the part to be welded 530 in the Y axis direction and on the minus side in the Z axis direction (that is, in the obliquely downward directions).

For example, out of the plurality of blow-off portions 210 to 240, two blow-off portions 210, 220 may supply shield gases from directions which obliquely intersect with the direction that the long-side portions 531, 532 of the part to be welded 530 extend (from the obliquely lateral directions). In the same manner, out of the plurality of blow-off portions 210 to 240, two remaining blow-off portions 230, 240 may supply shield gases from directions which obliquely intersect with the direction that the short-side portions 533, 534 of the part to be welded 530 extend (from the obliquely lateral directions), for example.

As described above, even when the blow-off portions 210 to 240 supply shield gases to the part to be welded 530 from the obliquely upward direction, the obliquely downward direction or the obliquely lateral direction, the jig 300, 300*a* can prevent merging of shield gases supplied from different directions at the part to be welded 530.

In the above-mentioned embodiment and the modification of the embodiment, the jig 300, 300*a* is formed of a solid member. However, provided that the jig 300, 300*a* is formed of a member having surfaces on both sides in the Y axis direction, the jig 300, 300*a* may not be formed of a solid member. Further, the jig 300, 300*a* may be formed of a member having two walls having wall surfaces which correspond to two respective long-side portions 531, 532 of the part to be welded 530.

Figure 11:
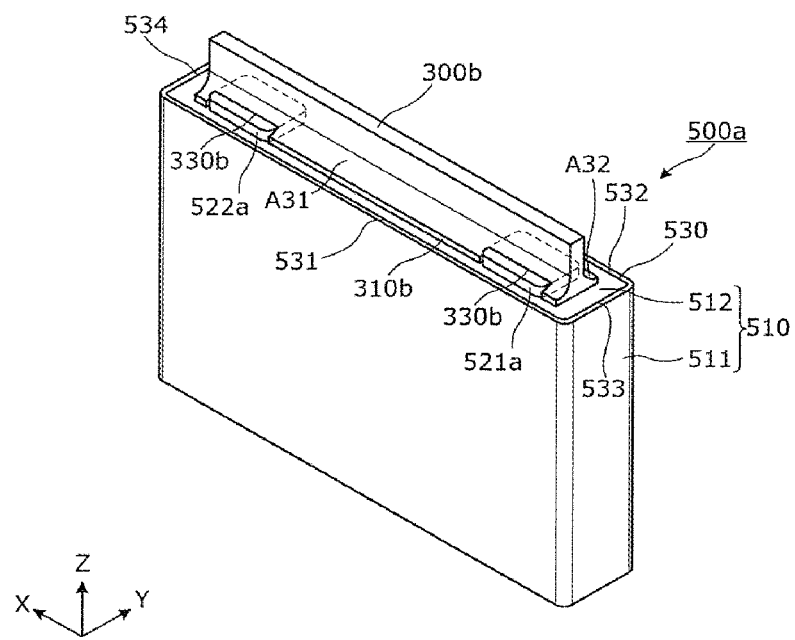
FIG. 11 is a perspective view showing an external appearance of an energy storage device in a state where a jig according to a modification is arranged at a predetermined position in the energy storage device.

In the above-mentioned embodiment and the modification of the embodiment, the jig 300, 300*a* is configured to cover the positive electrode terminal 521 and the negative electrode terminal 522 of the energy storage device 500. However, the present invention is not limited to such a configuration. For example, as in the case of an energy storage device 500*a* shown in FIG. 11 which includes a positive electrode terminal 521*a* and a negative electrode terminal 522*a* occupying a large rate of a width of the container 510 in the Y axis direction, when the jig is formed so as to cover the positive electrode terminal 521*a* and the negative electrode terminal 522*a*, the jig interferes with the part to be welded 530 so that laser welding cannot be performed. Accordingly, to overcome such a drawback caused due to such positive electrode terminal 521*a* and negative electrode terminal 522*a*, it may be possible to adopt a jig 300*b* having a proximal portion 310*b* where two groove portions 330*b* for accommodating the positive electrode terminal 521*a* and the negative electrode terminal 522*a* are formed in place of the groove portion 330 formed on the jig 300. In such a configuration, each of two groove portions 330*b* has a shape where both ends of the groove portion 330*b* are open in the Y axis direction of the jig 300*b*. Also with the use of the jig 300*b* having such a shape, the wall surfaces A31, A32 for shielding shield gases are formed on the jig 300*b* and hence, it is possible to prevent merging of two flows of the shield gases at two long-side portions 531, 532. FIG. 11 is a perspective view showing an external appearance of an energy storage device in a state where the jig according to the modification is arranged at a predetermined position in the energy storage device.

Further, embodiments obtained by arbitrarily combining respective constitutional elements which the above-mentioned embodiment and the modification of the embodiment include also fall within in the scope of the present invention.

INDUSTRIAL APPLICABILITY

According to the present invention, a stable shield gas atmosphere can be formed at a part to be welded and hence, the present invention can be effectively used as a method for manufacturing an energy storage device which can reduce the occurrence of defective welding.

DESCRIPTION OF REFERENCE SIGNS 10, 10a: manufacturing apparatus
100: welding unit
210, 220, 230, 240: blow-off portion
211, 221, 231, 241: introducing port
212, 222, 232, 242: blow-off port
300, 300a, 300b: jig
310, 310b: proximal portion
320: wall portion
330, 330b: groove portion
410, 420, 430, 440: fixing portion
500, 500a: energy storage device
510: container
511: body
511a: stepped portion
512: lid body
521, 521a: positive electrode terminal
522, 522a: negative electrode terminal
530: part to be welded
531, 532: long-side portion
533, 534: short-side portion
A11, A12, A21 to A24, A31, A32: wall surface
F11, F12, F21, F22: flow of shield gas
P1, P2: predetermined position

The invention claimed is:

1. A method for manufacturing an energy storage device by applying welding to a container of the energy storage device, the container including a plate member, the method comprising:
arranging a jig, on which a wall surface is formed, on the plate member and between two parts to be welded to which welding is applied; and
applying welding to the two parts to be welded while supplying a shield gas to the two parts to be welded from two different directions corresponding to the two parts to be welded,
wherein the wall surface is configured to flow the shield gas in a direction perpendicular to the plate member, and
wherein the wall surface includes a curved-bent surface which projects toward an inside of the wall surface.

2. The method for manufacturing an energy storage device according to claim 1, wherein, in the welding, the shield gas supplied to the part to be welded flow along an inclined surface which is at least a portion of the wall surface.

3. The method for manufacturing an energy storage device according to claim 1, wherein, in the arranging, the jig is arranged in a state where the jig is brought into contact with the container.

4. The method for manufacturing an energy storage device according to claim 1, further comprising cooling the jig.

5. The method for manufacturing an energy storage device according to claim 1, wherein, in the welding, welding is applied to the two parts to be welded by irradiating a laser beam toward the two parts to be welded from a predetermined position while changing an irradiation angle.

6. The method for manufacturing an energy storage device according to claim 1, wherein, in the welding, the shield gas is supplied to the two parts to be welded from the two different directions corresponding to the two parts to be welded substantially at a same timing.

7. The method for manufacturing an energy storage device according to claim 1, wherein, in the welding, the shield gas is supplied to four parts, including the two parts, to be welded from four different directions, including the two different directions, corresponding to the four parts to be welded substantially at a same timing.

8. An apparatus for manufacturing an energy storage device for applying welding to a container of the energy storage device, the container including a plate member, the apparatus comprising:
a jig on which a wall surface is formed and which is arranged on the plate member and between two parts to be welded to which welding is applied and to which a shield gas is supplied from two different directions,
wherein the wall surface is configured to flow the shield gas in a direction perpendicular to the plate member; and
two blow-off ports through which the shield gas is supplied to the two parts to be welded from the two different directions,
wherein the blow-off ports opposedly face a long-side portion of the container and include a width larger than a length of the long-side portion.

9. The apparatus for manufacturing an energy storage device according to claim 8, wherein at least a portion of the wall surface is inclined with respect to the direction that the shield gas flows.

10. The apparatus for manufacturing an energy storage device according to claim 8, wherein the container includes a body including a rectangular opening and an elongated plate-like lid body which closes the opening,
wherein the two parts to be welded form two long-side portions disposed opposite to each other out of a rectangular annular boundary portion between the body and the lid body,
wherein the jig is arranged between the two long-side portions, and
wherein at least a portion of the wall surface is inclined with respect to the direction that the shield gas flows such that the portion of the wall surface is disposed more away from the container as the portion of the wall surface extends to a downstream side in the direction that the shield gas flows.

11. An apparatus for manufacturing an energy storage device for applying welding to a container of the energy storage device, the apparatus comprising:
a jig on which a wall surface is formed and which is arranged between two parts to be welded to which welding is applied, a shield gas being supplied to the jig from two different directions,
wherein the wall surface includes a curved-bent surface which projects toward an inside of the wall surface.

12. The apparatus for manufacturing the energy storage device according to claim 11, wherein the container includes a plate member on which the jig is arranged, and
wherein the curved-bent surface is configured to flow the shield gas in a direction perpendicular to the plate member.

13. The apparatus for manufacturing the energy storage device according to claim 11, wherein the jig includes:
a bottom surface that attaches to a top surface of the container; and
a top surface that extends parallel to the bottom surface of the jig and the top surface of the container.

14. The apparatus for manufacturing the energy storage device according to claim 13, wherein the curved-bent surface extends from the top surface of the jig toward the bottom surface of the jig.

15. The apparatus for manufacturing the energy storage device according to claim 14, wherein the container includes a plate member on which the jig is arranged, and
> wherein an upper portion of the curved-bent surface extends perpendicular to the bottom surface of the jig to flow the shield gas in a direction perpendicular to the plate member.

16. The apparatus for manufacturing the energy storage device according to claim 13, wherein the jig further includes:
> a side surface extending, perpendicular to the bottom surface of the jig, between the curved-bent surface and the bottom surface of the jig.

17. The apparatus for manufacturing the energy storage device according to claim 16, wherein the curved-bent surface continuously extends from the top surface of the jig to the side surface of the jig.

18. The apparatus for manufacturing the energy storage device according to claim 16, wherein the curved-bent surface extends from the top surface of the jig to the side surface of the jig.

\* \* \* \* \*